(12) United States Patent
Barakat

(10) Patent No.: US 10,359,027 B2
(45) Date of Patent: Jul. 23, 2019

(54) HYDROELECTRIC POWER GENERATING SYSTEM

(71) Applicant: Yaser K. Barakat, Roanoke, VA (US)

(72) Inventor: Yaser K. Barakat, Roanoke, VA (US)

(73) Assignee: Yaser Barakat, Roanoke, VA (US)

( * ) Notice: Subject to any disclaimer, the term of this patent is extended or adjusted under 35 U.S.C. 154(b) by 0 days.

(21) Appl. No.: 15/398,600

(22) Filed: Jan. 4, 2017

(65) Prior Publication Data

US 2017/0204738 A1    Jul. 20, 2017

Related U.S. Application Data

(60) Provisional application No. 62/278,621, filed on Jan. 14, 2016.

(51) Int. Cl.
| | | |
|---|---|---|
| *F03D 9/00* | (2016.01) | |
| *F03B 13/06* | (2006.01) | |
| *F03B 13/08* | (2006.01) | |

(52) U.S. Cl.
CPC .............. *F03D 9/008* (2013.01); *F03B 13/06* (2013.01); *F03B 13/08* (2013.01); *F05B 2210/18* (2013.01); *F05B 2210/401* (2013.01); *F05B 2240/40* (2013.01); *F05B 2250/231* (2013.01); *Y02E 10/22* (2013.01); *Y02E 10/725* (2013.01); *Y02E 60/17* (2013.01)

(58) Field of Classification Search
CPC ........ Y02E 10/725; Y02E 10/72; Y02E 10/74
USPC .............................................. 290/52, 22, 44
See application file for complete search history.

(56) References Cited

U.S. PATENT DOCUMENTS

| | | | |
|---|---|---|---|
| 1,797,517 A | 3/1931 | Simchuk | |
| 2,163,102 A | 6/1939 | Odill | |
| 2,962,599 A | 11/1960 | Pirkey | |
| 4,182,123 A | 1/1980 | Ueda | |
| 4,499,034 A * | 2/1985 | McAllister, Jr. | .......... F03D 9/00 |
| | | | 261/109 |
| 4,767,938 A | 8/1988 | Bervig | |
| 8,803,346 B2 * | 8/2014 | Pitre | .................... F03B 13/186 |
| | | | 290/42 |
| 8,878,381 B2 * | 11/2014 | Henry | ................... F03B 13/264 |
| | | | 290/42 |
| 9,347,425 B2 * | 5/2016 | Wright | .................... F03B 13/14 |
| 2009/0256359 A1 * | 10/2009 | Bruk | ........................ F03D 1/02 |
| | | | 290/55 |

(Continued)

FOREIGN PATENT DOCUMENTS

| | | |
|---|---|---|
| CN | 2880912 Y | 3/2007 |
| JP | 09177654 A | 7/1997 |

*Primary Examiner* — Charles Reid, Jr.
(74) *Attorney, Agent, or Firm* — Bernard G. Pike; Pike IP Law, PLLC

(57) ABSTRACT

The hydroelectric power generating system includes a reservoir for retaining a body of water and an outer vessel that surrounds a peripheral wall of the reservoir. A circumferential canal extends between an upper portion of the reservoir peripheral wall and the outer vessel. One or more penstocks extend below the canal between the reservoir and the outer vessel. Each penstock has one or more hydroelectric turbine generators installed therealong. A plurality of primary wind turbines can be disposed on a peripheral wall of the reservoir and a plurality of air columns can be disposed within the reservoir to generate auxiliary power.

15 Claims, 14 Drawing Sheets

(56) References Cited

U.S. PATENT DOCUMENTS

| | | | |
|---|---|---|---|
| 2010/0050500 A1* | 3/2010 | Pieraccini | C10G 2/30 44/300 |
| 2011/0285136 A1* | 11/2011 | Desmeules | F03B 17/061 290/54 |
| 2012/0061967 A1 | 3/2012 | Chaganti et al. | |
| 2012/0187690 A1 | 7/2012 | Walton et al. | |
| 2013/0088190 A1* | 4/2013 | Kang | B01F 7/00916 320/107 |
| 2014/0197641 A1 | 7/2014 | Barakat | |
| 2015/0084341 A1* | 3/2015 | Berry | F03D 9/002 290/55 |
| 2015/0219066 A1* | 8/2015 | Solheim | E02B 9/08 290/53 |

\* cited by examiner

HYDROELECTRIC POWER GENERATING SYSTEM

CROSS-REFERENCE TO RELATED APPLICATION

This application claims the benefit of U.S. Provisional Patent Application Ser. No. 62/278,621, filed Jan. 14, 2016.

BACKGROUND OF THE INVENTION

1. Field of the Invention

The present invention relates to electrical power generating systems, and particularly to a hydroelectric power generating system including a man-made reservoir with one or more penstocks extending from a common waterway and one or more electrical generating turbines disposed along each of the penstocks.

2. Description of the Related Art

Hydroelectric power generating systems have been known for a considerable period of time. Conventional systems utilize a natural geographic basin, valley, or the like, and place a man-made dam across a channel in the natural terrain to create a reservoir upstream of the dam. The water is then made to flow through one or more power generating turbines in the dam (or in a powerhouse constructed with the dam), to generate electrical power. Generally, only a single generating turbine is installed in each penstock of the facility, although multiple penstocks are common in a single conventional hydroelectric power generating system.

An example of such a conventional hydroelectric power generating system is found in Japanese Patent Publication No. 9-177,654, published on Jul. 11, 1997. This reference describes (according to the drawings and English abstract) a hydroelectric power generating system incorporating a single penstock run with multiple generating turbines installed therealong. One embodiment is illustrated having an upstream reservoir and dam and a second downstream reservoir and dam, and generating turbines installed downstream of each dam.

Another example is found in Chinese Patent Publication No. 2,880,912 published on Mar. 21, 2007 to Wu Jinnan. A plurality of generating turbines is installed in series along stepped concrete bases downstream of the dam.

Thus, a hydroelectric power generating system solving the aforementioned problems is desired.

SUMMARY OF THE INVENTION

The hydroelectric power generating system comprises a man-made dam structure that completely encircles a water reservoir enclosed therein. The water may be pumped from a variety of sources, such as the ocean, as well as rivers, lakes, and streams. The man-made dam structure and transport of the water enables the hydroelectric power generating system to be constructed virtually anywhere, so long as there is sufficient land available for the facility. The dam may be substantially circular, or may have any other desired configuration. At least one sluice gate, and preferably a plurality of such gates, feeds a peripheral canal near the top of the dam. The peripheral canal, in turn, feeds at least one penstock, and preferably a plurality of such penstocks. Each penstock includes at least one electrical generating turbine, and preferably a plurality of such turbines, therealong. The downstream end of the penstock or penstocks feed into an enclosed circumferential channel within the base of the dam. A return line extends from the channel through the base of the dam and into the reservoir. A pump is installed in the return line, enabling water to be pumped from the return line back into the reservoir. While this system results in a net loss of energy, it does enable the reservoir to be replenished during periods where surplus electrical energy is available.

The system uses water to generate essentially "clean" energy. Construction of a sufficient number of such facilities, and/or of sufficient water volume, would result in some slight reduction in sea level as water is drawn from the oceans to the reservoirs. The reservoirs would also serve as convenient water recreational sites, as any number of such facilities could be constructed convenient to large population centers, as opposed to conventional hydroelectric dams and their reservoirs. The hydroelectric power generating system would make use of salt water from the sea, rather than fresh water. The dissolved salt and minerals in the water may prove to be of some benefit to some individuals. Also, it is anticipated that the relatively large volume of ocean water captured within the dams would provide a practical environment for the farming of many ocean-dwelling fish and other marine life, as well as serving to protect endangered species of marine life.

These and other features of the present invention will become readily apparent upon further review of the following specification and drawings.

Figure 7:
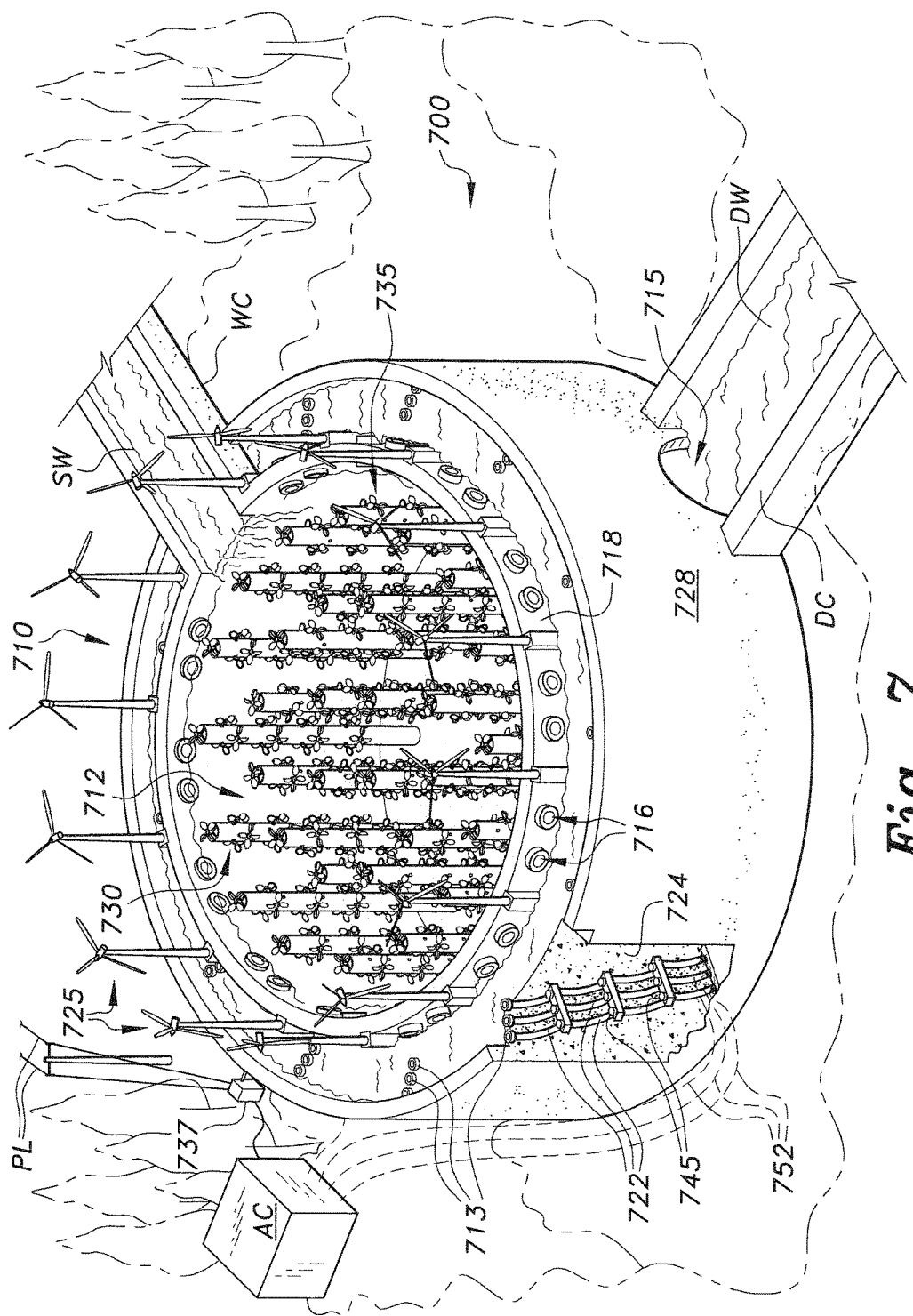
FIG. 7 is an environmental view of another embodiment of a hydroelectric power generating system, according to the present invention.
Figure 10A:
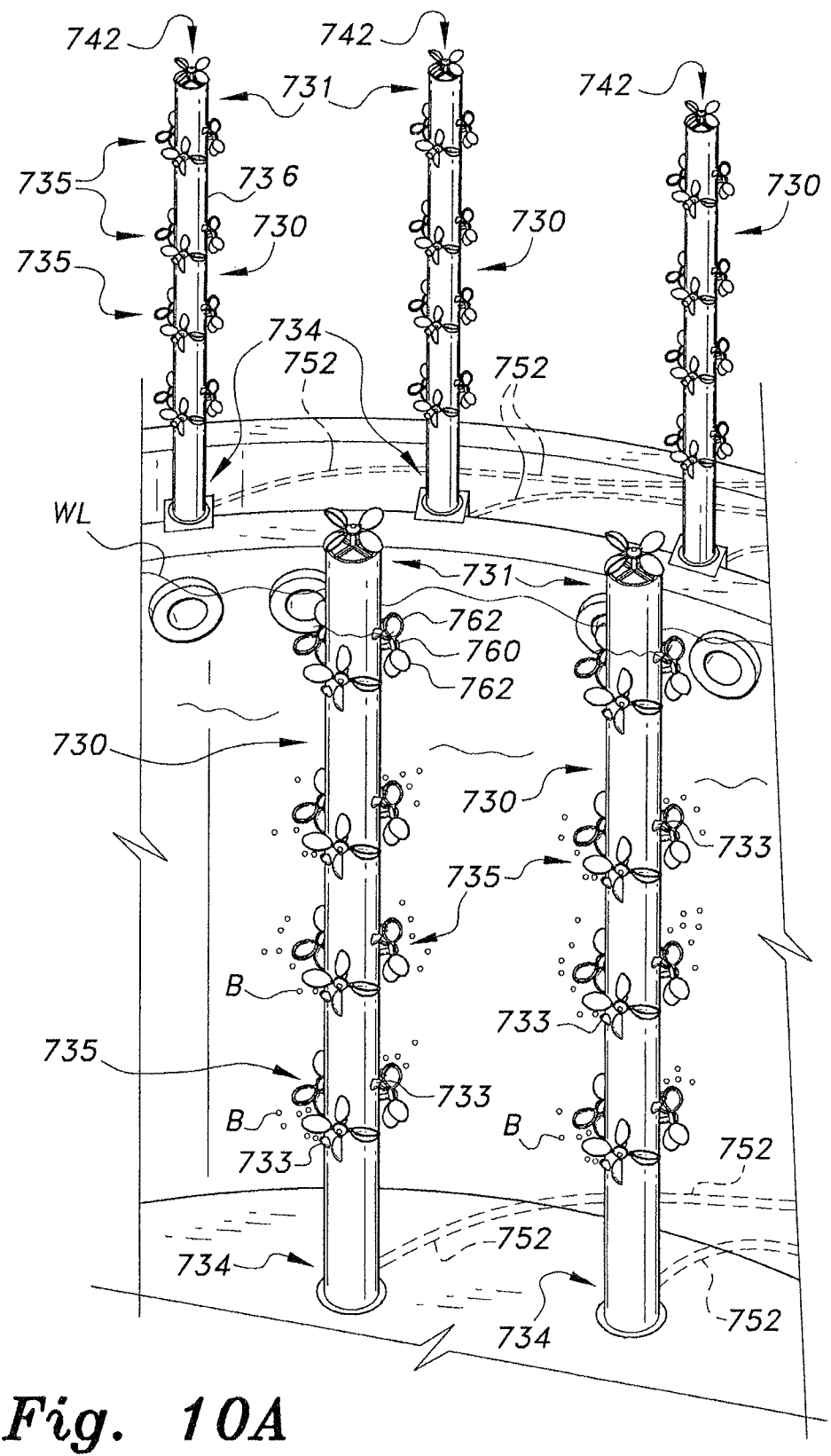
FIG. 10A is a perspective view of a plurality of air columns for the hydroelectric power generating system shown in FIG. 7, illustrating their general features.

10B is a cut away view of one of the plurality of air columns shown in FIG. 10A for the hydroelectric power generating system shown in FIG. 7, illustrating its general features.

Similar reference characters denote corresponding features consistently throughout the attached drawings.

DETAILED DESCRIPTION OF THE PREFERRED EMBODIMENTS

The hydroelectric power generating system includes a reservoir, a common canal or water way surrounding a hollow cavity, and one or more penstocks extending from the common water way. The vessel can be positioned within or proximate a river or other water source to provide a reservoir of water within the cavity.

Figure 1:
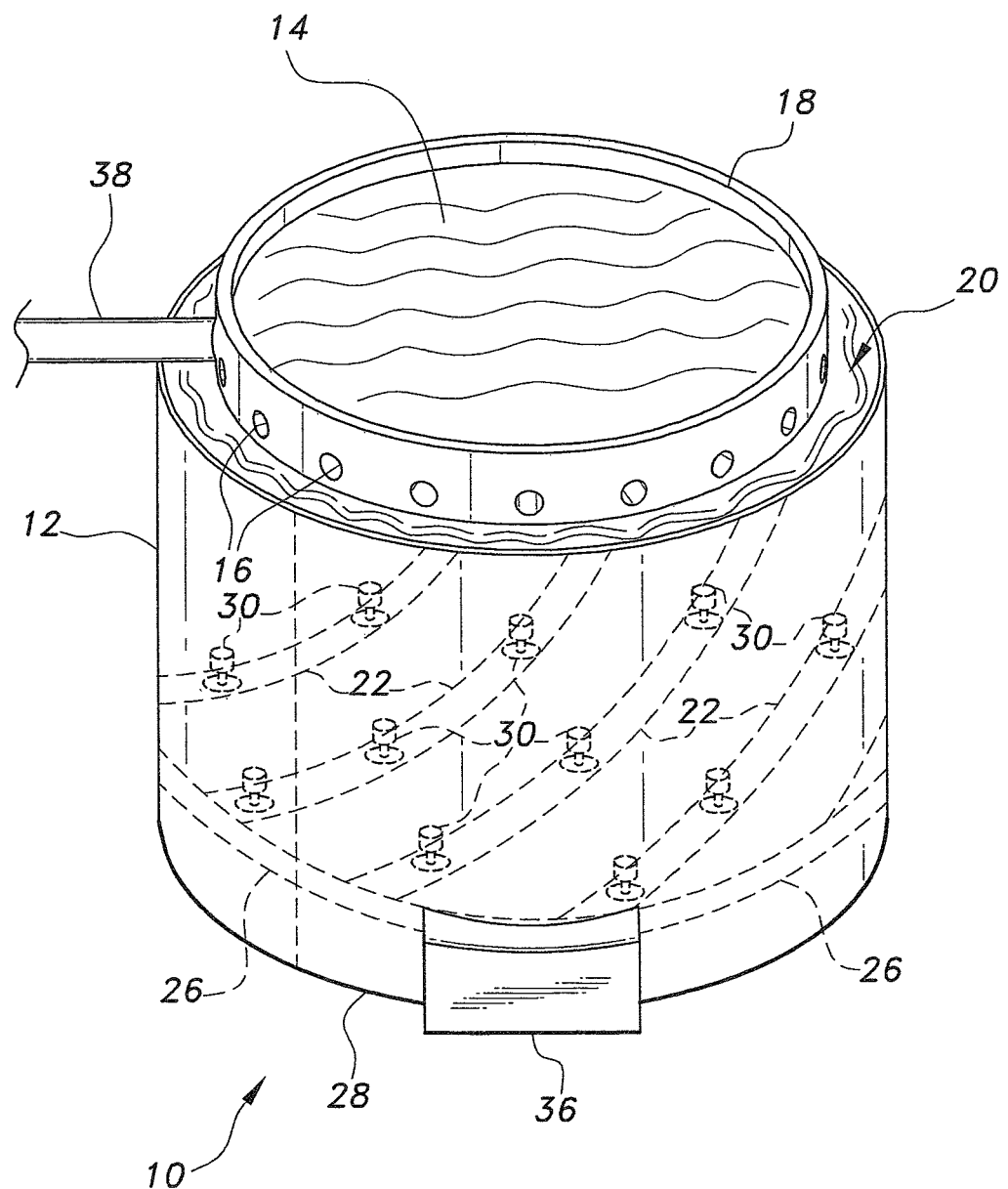
FIG. 1 is a diagrammatic perspective view of an embodiment of a hydroelectric power generating system according to the present invention, illustrating its general features.
Figure 2:
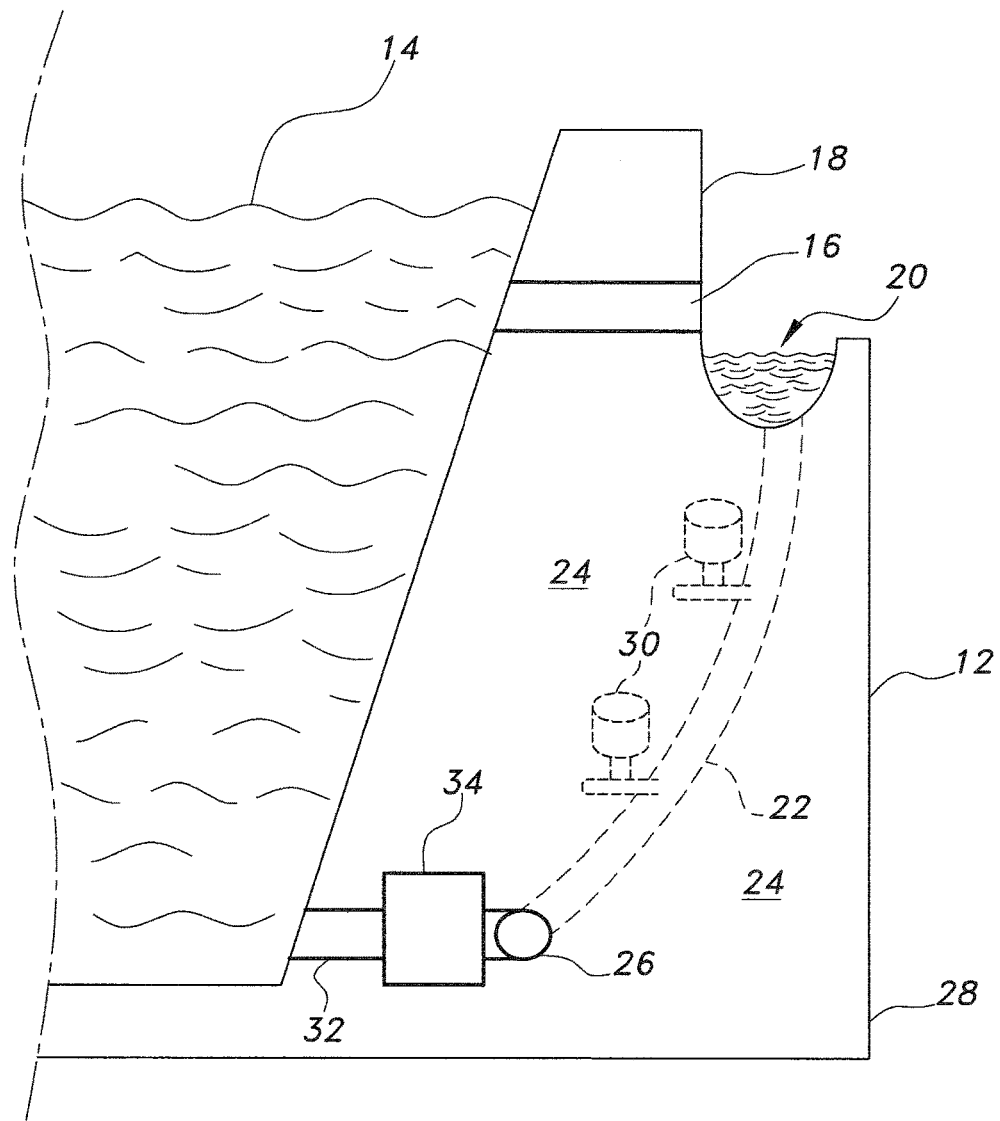
FIG. 2 is a diagrammatic elevation view in section of the embodiment of a hydroelectric power generating system according to the present invention, illustrating further details thereof.

FIGS. 1-10B depict various embodiments of a hydroelectric power generating system according to the present teachings. Referring to FIGS. 1-2, a first embodiment of a hydroelectric power generating system, generally designated as 10, is shown. The system 10 incorporates a relatively large dam 12 or wall defining a dam that completely encircles or laterally encloses a reservoir 14 therein. The dam 12 may have a generally cylindrical configuration, as shown in FIG. 1, or may have any other desired external shape or configuration. The dam 12 includes at least one sluice gate 16 (and preferably a plurality of sluice gates 16) extending through the upper portion 18 thereof. The sluice gates 16 permit the flow of water from the upper levels of the reservoir 14 through the dam 12 and into an externally disposed peripheral canal 20 that surrounds the upper portion 18 of the dam 12.

At least one penstock 22 (preferably a plurality of penstocks 22) extends from the peripheral canal 20 downward through the interior 24 of the dam 12 to an internal collection channel 26 disposed within the base 28 of the dam 12. The penstocks 22 do not descend vertically within the interior 24 of the dam 12, but describe helical arcs as each of the penstocks 22 traverses a portion of the circumference of the dam 12, generally as illustrated in FIGS. 1 and 2 of the drawings. Each penstock 22 includes at least one (and preferably a plurality of) hydroelectric turbine generator 30 installed therealong. The installation of a plurality of generators 30 in each penstock 22 provides additional power recovery from the energy developed by the water as it continues to flow through the penstock from the uppermost generator 30.

Water flows from the upper level of the reservoir 14 through the sluice gates 16 and into the peripheral upper canal 20. Water flow through the sluice gates 16 may be controlled by conventional gate valves or the like. The water then flows downward through the penstocks 22 to operate the generators 30 for electrical power generation. Each of the penstocks 22 may also include a conventional gate valve or other water control or shutoff device. The water then flows from the lower ends of the penstocks 22 into the internal collection channel 26 within the interior 24 of the base 28 of the dam 12. A return passage 32 extends from the collection channel 26 and the lower level of the reservoir 14, as shown in FIG. 2. As water seeks its own level, it will be seen that there will be no net flow through the system when the water level in the reservoir 14 is equal to the water level in the peripheral canal 20. However, a pump 34 is provided in or along the return passage 32 to deliver water from the collection channel 26 back into the reservoir 14. While only a single return passage 32 and pump 34 are shown, it will be understood that a plurality of return passages and pumps may be provided, if desired. While the power required to operate the pump 34 is greater than the power generated by the hydroelectric turbine generators 30, the pump 34 may be operated at times of low electrical power demand by consumers to enable the hydroelectric power generating system 10 to function. A powerhouse 36 is provided external to the base 28 of the dam 12 to control and distribute electrical power generated by the system, and to control and operate the pump 34 as well. A conventional external energy source provides the energy to operate the powerhouse.

The system 10 as described above is a closed system, i.e., water is not permitted to escape the system, except by evaporation and/or leakage. This is because the water to be used in the system 10 is taken from the sea, i.e., it is salt water unsuited for irrigation or potable consumption. The salt water is pumped from a suitable oceanic source through a seawater delivery line 38 that communicates with the reservoir 14, as shown in FIG. 1, to fill the reservoir volume 14 initially. The use of seawater with the hydroelectric power generation system 10 may provide a number of benefits. The construction of a large number of very large systems on otherwise unusable land (desert, etc.) could accept a small percentage of the water of the present oceans and seas of the planet, and thereby reduce the rising sea level trend that has developed, at least to some small extent. The recreational value of such installations when constructed near large population centers has been noted further above. Some persons may find that swimming or bathing in the salt water may provide certain benefits, and the construction of such systems convenient to their homes serves to facilitate access. The relatively large volume of salt water contained by very large dams 12, or by a series of such dams 12, will provide support for a large number of fish and other marine animals. These fish and/or marine animals may be harvested for edible consumption, and/or the reservoir volumes may serve as habitats for endangered species. Accordingly, the present hydroelectric power generating system provides a number of benefits in addition to potential power production.

Figure 3:
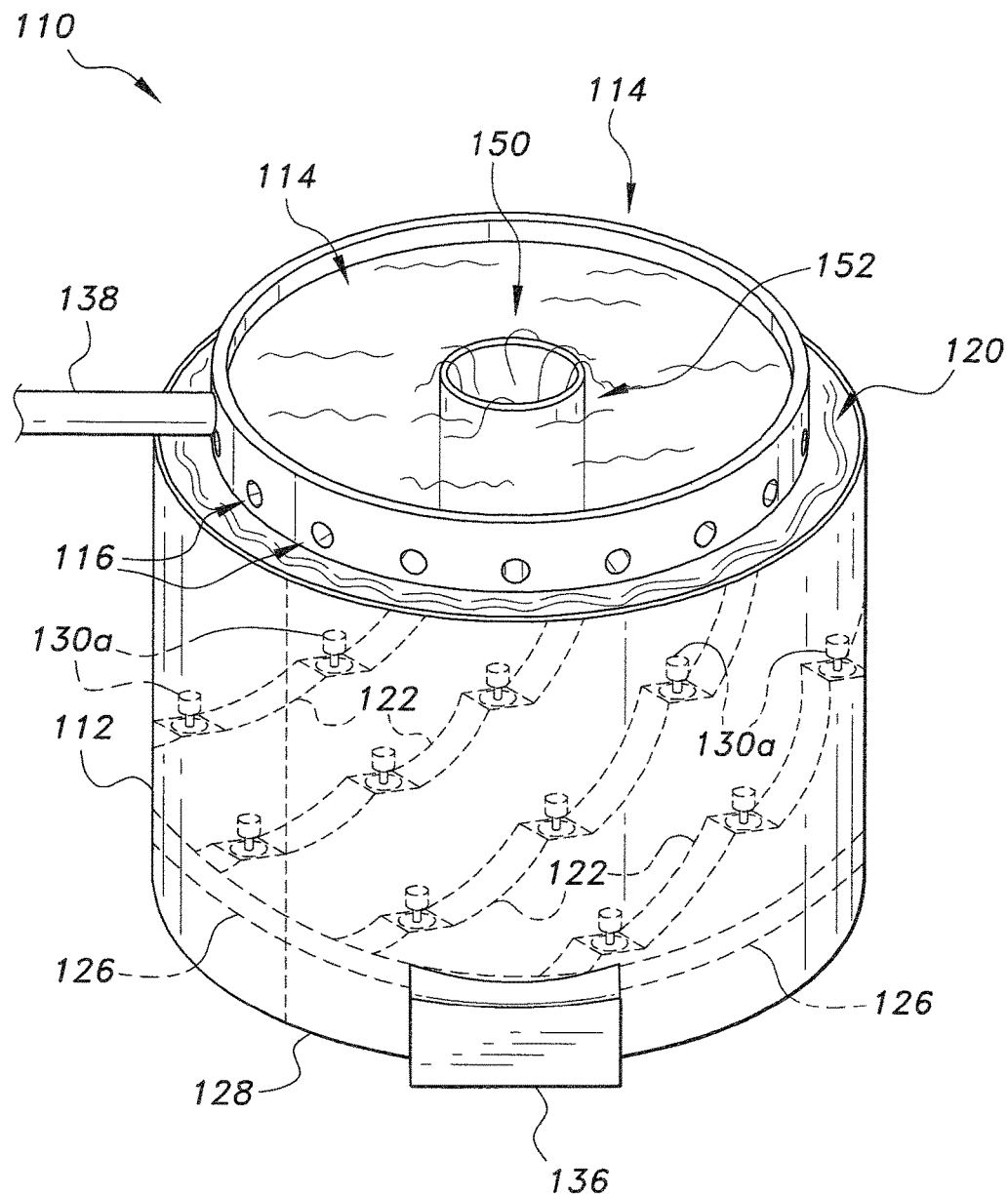
FIG. 3 is a diagrammatic perspective view of another embodiment of a hydroelectric power generating system according to the present invention, illustrating its general features.
Figure 4:
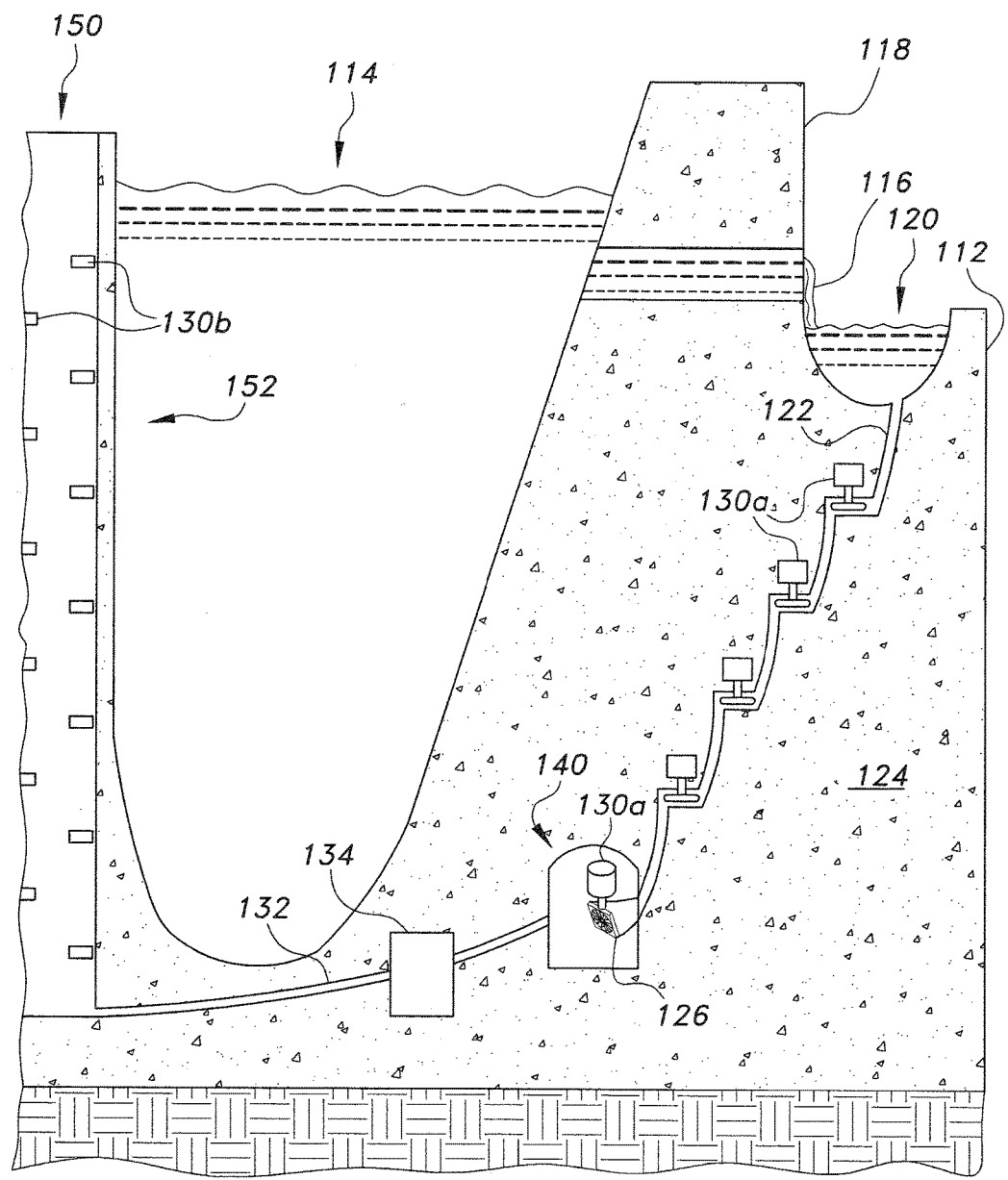
FIG. 4 is a diagrammatic sectional view of the hydroelectric power generating system shown in FIG. 3, illustrating its general features.

Referring to FIGS. 3-5, 6A, and 6B, a second embodiment of a hydroelectric power generating system, generally designated as 110, is shown. The system 110 includes features that enhance the utilization of hydrodynamics to produce energy. Referring to FIG. 3 of the drawings, the hydroelectric power generating system 110 incorporates a relatively large dam 112 or wall defining a dam that completely encircles or laterally encloses a reservoir 114 therein, and an auxiliary power generating system 150 within said reservoir 114. The dam 112 can have a generally cylindrical configuration, as shown in FIG. 3, or may have any other desired external shape or configuration. The dam 112 includes at least one sluice gate 116 (and preferably a plurality of sluice gates 116) extending through the upper portion 118 thereof and an annular tunnel 140 within the interior 124 of the base 128 of the dam 112, as generally illustrated in FIG. 4 of the drawings. The sluice gates 116 permit the flow of water from the upper levels of the reservoir 114 through the upper portion 118 and into an externally disposed peripheral canal 120 that surrounds the upper portion 118 of the dam 112.

At least one penstock 122 (preferably a plurality of penstocks 122) extend downward from the peripheral canal 120 through the interior 124 of the dam 112. The penstocks 122 do not descend vertically within the interior 124 of the dam 112, but are arranged in a step configuration and describe generally helical arcs as each of the penstocks 122 traverses a portion of the circumference of the dam 112. As such, the step configuration follows a general spiral curve. Each penstock 122 includes at least one (and preferably a plurality of) hydroelectric turbine generator 130a installed therealong. The installation of a plurality of hydroelectric turbine generators 130a in each penstock 122 provides additional power recovery from the energy developed by the water as it continues to flow downward through the penstock 122 from the uppermost hydroelectric turbine generator 130a. The step configuration provides stable support and allows for greater variety in the arrangement and utilization of multiple hydroelectric turbine generators 130a in each penstock 122. Depending on the amount of energy required, it is possible to increase the number of penstocks in the interior 124 of the dam 112 by widening the peripheral canal 120.

The hydroelectric turbine generation system 110 functions substantially similar to the previous embodiment in that water flows from the upper level of the reservoir 114 through the sluice gates 116 and into the peripheral canal 120. Water flow through the sluice gates 116 may be controlled by conventional gate valves or the like. The water then flows downward through the penstocks 122 to operate the hydroelectric turbine generators 130a for electrical power generation. Each of the penstocks 122 can also include a conventional gate valve or other water control or shutoff device. The water then flows from the lower end of the penstocks 122 into the annular tunnel 140 within the interior 124 of the base 128 of the dam 112. The annular tunnel 140 is adapted to house an internal collection channel 126 and a return passage 132. The return passage 132 defines a fluid conduit extending from the annular tunnel 140 to the auxiliary power generation system 150. The annular tunnel 140 provides space for at least one additional hydroelectric turbine generator to increase power capacity.

Referring to FIG. 4, as the water flows downward through the penstocks 122 from the externally disposed peripheral canal 120, the flowing water provides the hydrodynamic forces to operate the hydroelectric turbine generators 130a in order to convert the same into useable energy. At the lower end of the dam 112 the flowing water enters the internal collection channel 126 located within the annular tunnel 140 where additional power can be generated by the additional hydroelectric turbine generator contained therein.

Figure 5:
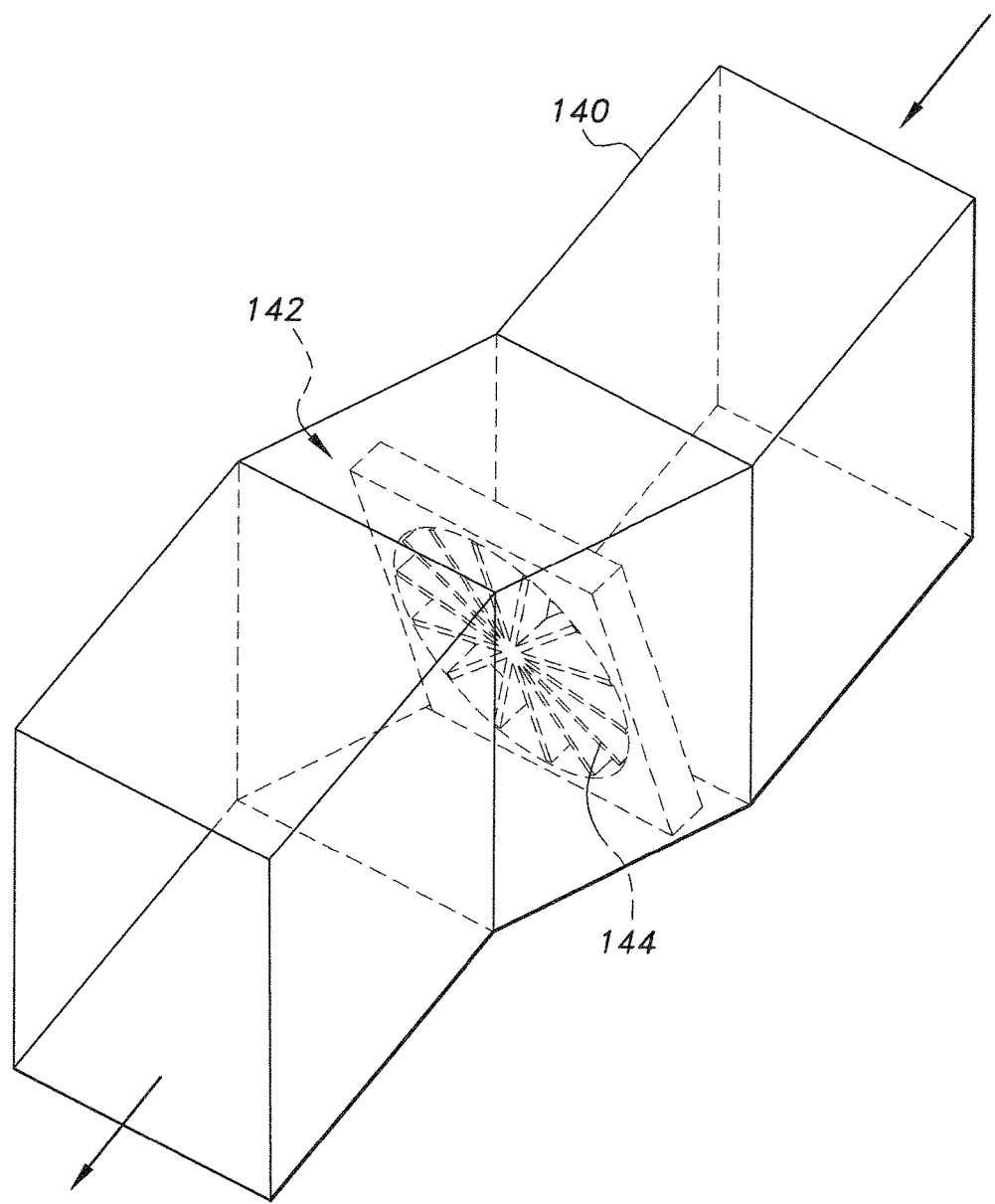
FIG. 5 is a diagrammatic perspective view of a turbine for the hydroelectric power generating system shown in FIG. 3.

The additional hydroelectric turbine generator can be the same as the hydroelectric turbine generator 130a disposed in the stepped areas of the penstock 122. However, there can be instances in which much of the pressure head can be lost or low. In order to compensate for this lost pressure, the annular tunnel 140 can be provided with another embodiment of a turbine, as illustrated in FIG. 5. The turbine 142 can be a very low head turbine, which includes a plurality of blades 144 radiating in a fan configuration. The blades 144 are desirably configured so that minimal hydrodynamic forces are required to rotate the same. It is to be noted that the turbine 142 can operate even when pressure loss is minimal.

After the water flows through the annular tunnel 140, the water is expelled through respective return passages 132. A pump 134 is provided in or along the return passage 132 to deliver water from the internal collection channel 126 towards the auxiliary power generating system 150 when the pressure of the expelled water is not enough to propel the water from the internal collection channel 126 into the auxiliary power generation system 150. While only a single annular tunnel 140 and pump 134 are shown, it will be understood that a plurality of these components can be provided, if desired. As in the first embodiment, while the power required to operate the pump 134 can be great, the pump 134 can be operated at times of low electrical power demand to enable the hydroelectric power generating system 110 to function. A powerhouse 136 is provided external to the base 128 of the dam 112 to control and distribute electrical power generated by the system, and to control and operate the pump 134 as well.

Unlike the previous embodiment of the hydroelectric power generator 10, the hydroelectric power generator system 110 utilizes the water expelling from the lower portion of the penstocks 122 to generate additional power through the auxiliary power generation system 150. The auxiliary power generating system 150 of the hydroelectric power generating system 110 includes an elongated column 152 extending from the bottom of the reservoir 114 toward the top of the reservoir 114, as generally illustrated in FIG. 3 of the drawings. Due to the operating environment, the column 152 is provided with a relatively wide base 153 to provide a stable support. As shown, the base can be constructed as a substantially conical flute. It should be noted, however, other variants of the base can be provided for the base such as block support structures or any other desired shape that can provide stability. The column 152 can have a generally cylindrical configuration, as shown in FIG. 3, or can have any other desired external shape or configuration. The column 152 is in communication with at least one compressor unit 155, such as an air compressor unit, that creates air current and includes at least one (and preferably a plurality of) hydroelectric turbine generator 130b installed within the column 152. The hydroelectric turbine generators 130b can be arranged along the circumference of the inner wall of the column 152, as generally illustrated in FIG. 4 of the drawings, on at least one (and preferably a plurality of) horizontal support beam 156 within the column 152, as generally illustrated in FIG. 6A of the drawings, on at least one (and preferably a plurality of) vertical support beam 158 within the column 152, as generally illustrated in FIG. 6B of the drawings, or can be arranged in a combination of these configurations.

Figure 6A:
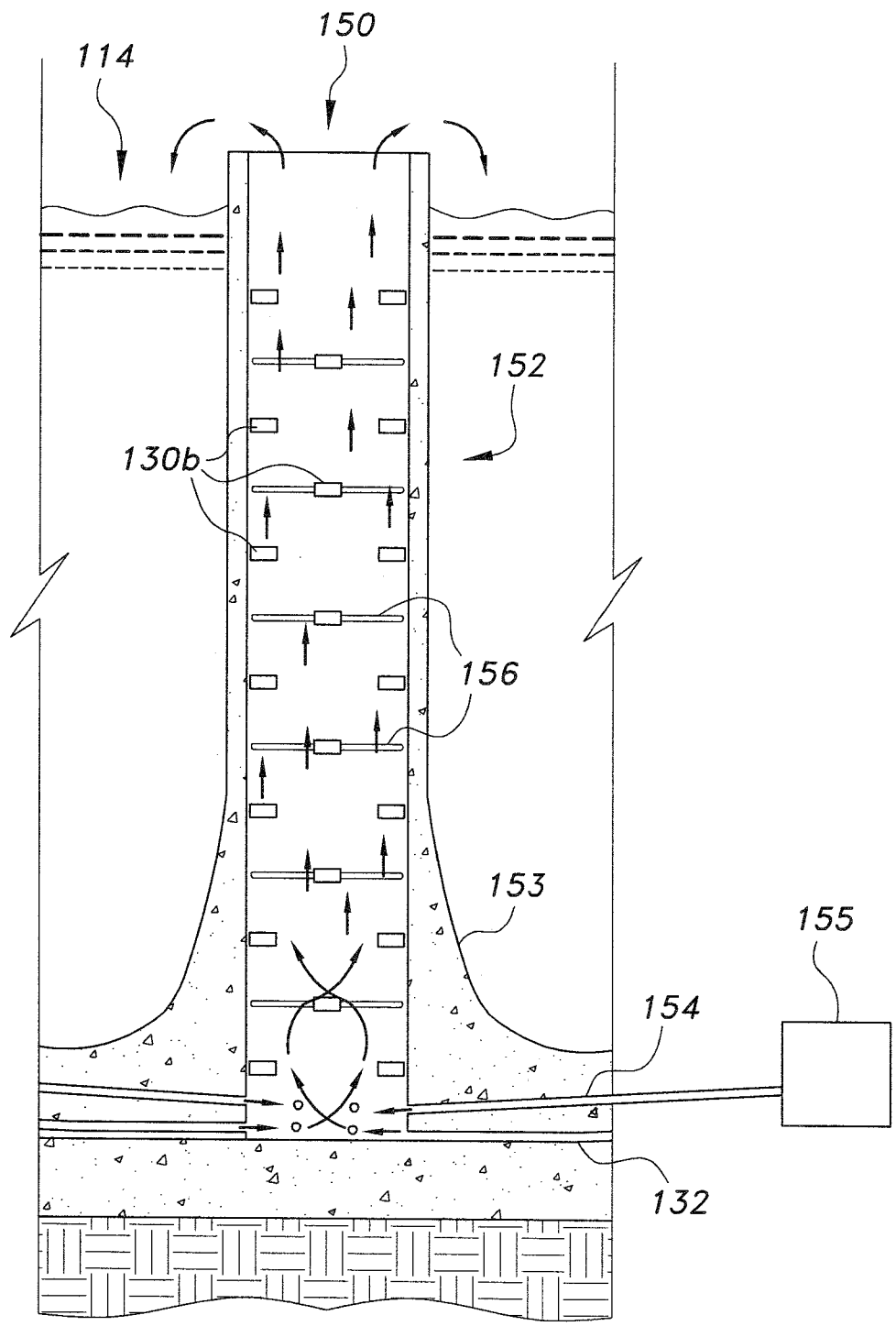
FIG. 6A is a diagrammatic sectional view of an auxiliary power generating system in the hydroelectric power generating system shown in FIG. 3, illustrating its general features.
Figure 6B:
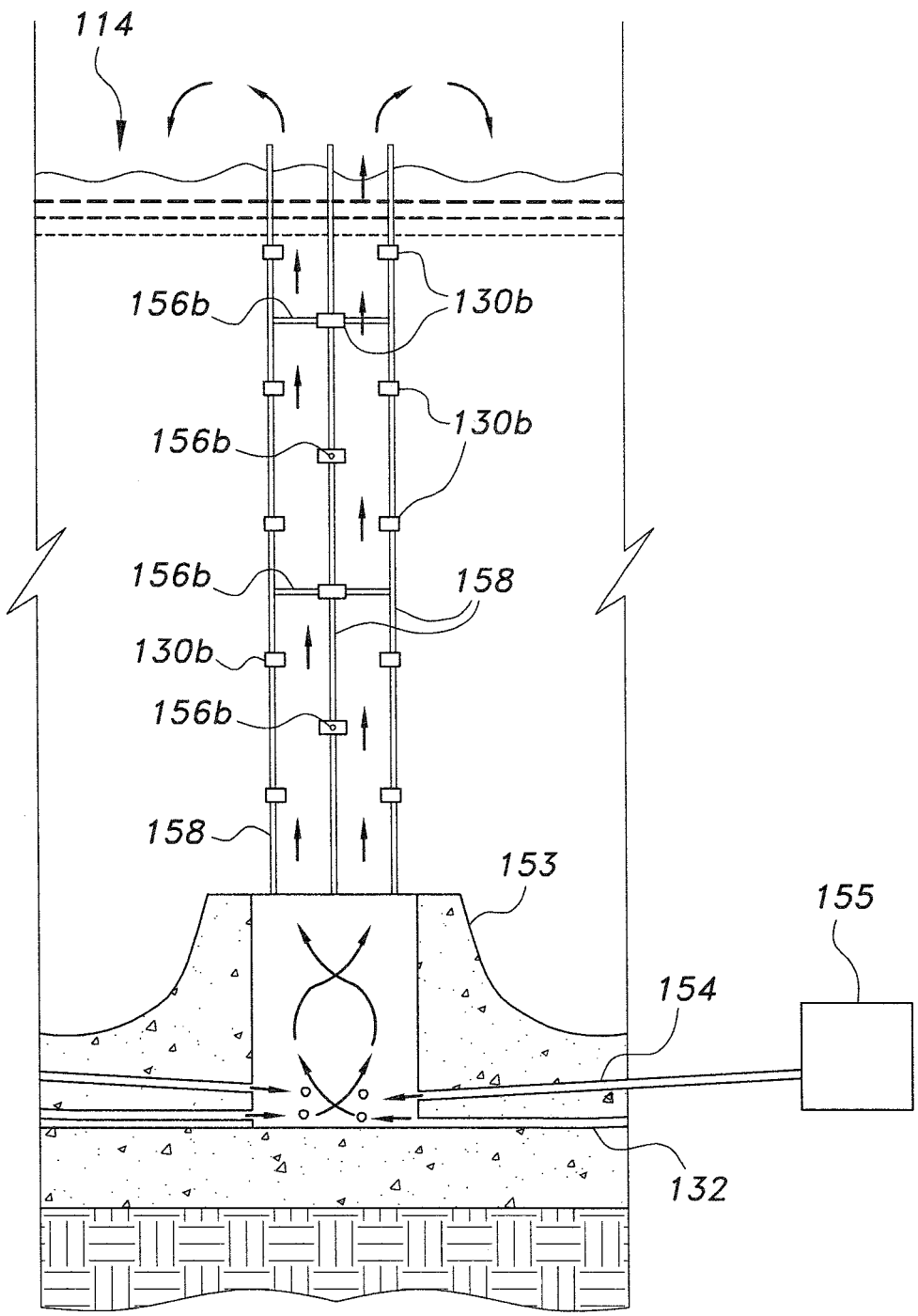
FIG. 6B is a diagrammatic sectional view of another embodiment of an auxiliary power generating system in the hydroelectric power generating system shown in FIG. 3, illustrating its general features.

Referring to FIGS. 6A and 6B, the water flowing out of the return passage 132 and into the auxiliary power generating system 150, is mixed with air from the compression unit 155 once in the column 152. The water pressure at the exit is preferably high to move water up the column 152. High pressure can be provided by several different mechanisms. For example, the return passage 132 can be configured so that it is progressively constricted towards the outlet, wherein a nozzle can be provided at the outlet, the pump 134 can be operated at high pressure, and the like. As the water is being introduced into the column 152, it is aerated by the air blowing into the column 152 from the compressor unit 155 that provides air through at least one inlet 154. The return passage 132 can be arranged so that the outlet thereof enters the column 152 at a substantial tangent so as to induce swirling and mixing of the water and air. The aerated water flows upward through the column 152 with sufficient velocity and momentum to operate the at least one hydroelectric turbine generator 130b located within the column 152 for electrical power generation. After the water is propelled upward through the hydroelectric turbine generators 130b, the aerated water expels back into the reservoir 114 as depicted by the arrows in FIGS. 6A and 6B of the drawings.

The embodiment of the auxiliary power generation system illustrated in FIG. 6B is substantially the same as that shown in FIG. 6A. However, the auxiliary power generation system 150 includes a plurality of vertical support beams 158 arranged in a circular pattern forming a substantially cylindrical cage. Unlike FIG. 6A, the substantially cylindrical cage does not have an outer wall, the vertical support beams 158 are free-standing from the base 153. Cross support can be provided by horizontal support beams, as illustrated by the horizontal support beams 156b.

Referring to FIGS. 3-5, 6A and 6B, the system 110 is a closed system, i.e., water is not permitted to escape the system, except by evaporation and/or leakage. This is because the water to be used in the hydroelectric power generating system 110 is taken from the sea, i.e., it is salt water unsuited for irrigation or potable consumption. The salt water is pumped from a suitable oceanic source through a seawater delivery line 138 that communicates with the reservoir 114, as shown in FIG. 3, to fill the reservoir volume 114 initially. The use of seawater with the hydroelectric power generation system 110 may provide a number of benefits. The construction of a large number of very large systems on otherwise unusable land (desert, etc.) could accept a small percentage of the water of the present oceans and seas of the planet, and thereby reduce the rising sea level trend that has developed, at least to some small extent. The recreational value of such installations when constructed near large population centers has been noted further above. Some persons may find that swimming or bathing in the salt water may provide certain benefits, and the construction of such systems convenient to their homes serves to facilitate access. The relatively large volume of salt water contained by very large dams 112, or by a series of such dams 112, will provide support for a large number of fish and other marine animals. These fish and/or marine animals may be harvested for edible consumption, and/or the reservoir volumes may serve as habitats for endangered species. The hydroelectric power generating system can be adapted to include a filtration system to prevent any unwanted materials, such as trash, from entering the hydroelectric power generating system and obstructing the hydroelectric power generators. The filtration system can also be adapted to include a mechanism to control bacteria to protect the hydroelectric turbine generators from failing. Accordingly, the present hydroelectric power generating system provides a number of benefits in addition to potential power production.

FIGS. 7-10B of the drawings depict another embodiment of a hydroelectric power generating system 700, which, similar to embodiments 10 and 110, includes a reservoir 710 or receptacle or chamber for storing water from which water flows through sluice gates 716 and into a peripheral canal 720. Unlike the hydroelectric power generating system 10 and 110, however, the hydroelectric power generating system 700 includes a plurality of primary wind turbines 725 on the collection basin 712 and a plurality of air columns 730 vertically disposed within the collection basin 712. Each of the plurality of air columns 730 includes a plurality of bubble turbines 735 (desirably six to nine bubble turbines per air column 730). An air compressor AC is in communication with the wind turbines 725. The wind turbines 725 power the air compressor AC. The air compressor produces compressed air or bubbles to the reservoir, which are used by the bubble turbines 735 as described further herein. The primary wind turbines 725 and the bubble turbines 735 can further be in communicating relation with a junction box 737, so that the energy generated by each of the primary wind turbines 725 and each of the bubble turbines 735 can be transferred to the junction box 737 and, subsequently, transferred to a power grid (not shown), such as through power lines PL, and/or used as a power source for the air compressor AC.

Figure 8:
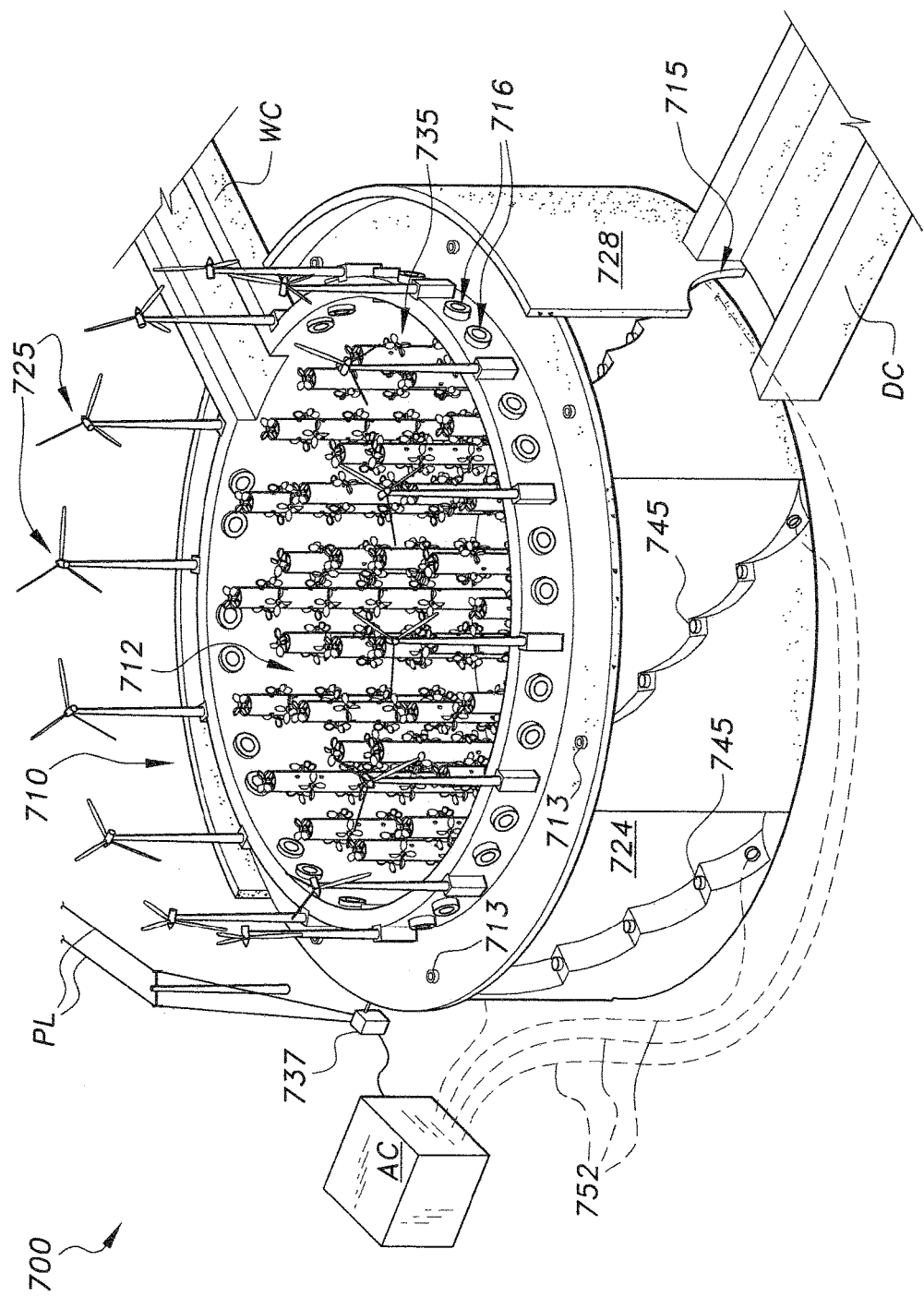
FIG. 8 is a perspective view of the hydroelectric power generating system shown in FIG. 7, showing a portion of the outer vessel cut away.

As illustrated in FIGS. 7 and 8, the primary wind turbines 725 can be any type of suitable wind turbine known in the art. While FIGS. 7 and 8 illustrate the primary wind turbines 725 being mounted on the reservoir 710, it is to be noted that the primary wind turbines 725 can be positioned separate from, but within a relative proximity to the reservoir 710.

The reservoir 710 may have any suitable shape, such as a substantially circular shape, a substantially oval shape, or a substantially rectangular shape, and can be formed from any suitable material, such as concrete. It is to be noted that the size of the reservoir 710 can vary depending on the amount of energy that is required to be produced. Preferably, the reservoir 710 is disposed in or proximate a river or other body of water, such that water can easily flow into the reservoir 710 from the river or other water source or body. For example, the reservoir 710 can be disposed under the water level of the river or water source. If the reservoir 710 is not disposed within the water source, a water conduit WC can be provided to connect the reservoir 710 to the water source.

The reservoir 710 includes a peripheral wall with an upper portion 718 and a collection basin 712 positioned within the peripheral wall. An outer vessel 728 surrounds the wall of the reservoir 710. The sluice gates 716 extend through an upper portion 718 of the wall of the reservoir 710. The sluice gates 716 can be opened to allow source water SW to flow from the reservoir 710 into the peripheral canal 720 between the reservoir 710 and the outer vessel 728. It is to be noted that the flow of source water SW through each of the sluice gates 716 may be controlled by conventional gate valves or the like.

Unlike the embodiments of the hydroelectric power generating system 10 and 110, the system 700 includes at least one penstock 722 (and preferably a plurality of penstocks 722) extending below the peripheral canal 720 through an outer cavity 724 defined between the reservoir and the outer vessel 728. Each penstock 722 has an upper end 746 and a lower end 747 arranged in a step configuration. The upper end 746 of the penstock 722 is positioned in communicating relation with a penstock entry port 713. As illustrated in FIG. 8, the penstocks 722 do not extend within the reservoir 710. Each penstock 722 includes at least one hydroelectric turbine generator 745 (and preferably a plurality of hydroelectric turbine generators 745) installed therealong.

The installation of at least one hydroelectric turbine generator 745 in each penstock 722 provides power recovery from the energy developed by the water as it flows downward through the penstock 722. The step configuration provides stable support and allows for greater variety in the arrangement and utilization of multiple hydroelectric turbine generators 745 in each penstock 722 (as illustrated in FIG. 7). Similar to the system 110, the number of penstocks 722 can be increased by widening the peripheral canal 720.

Figure 9A:
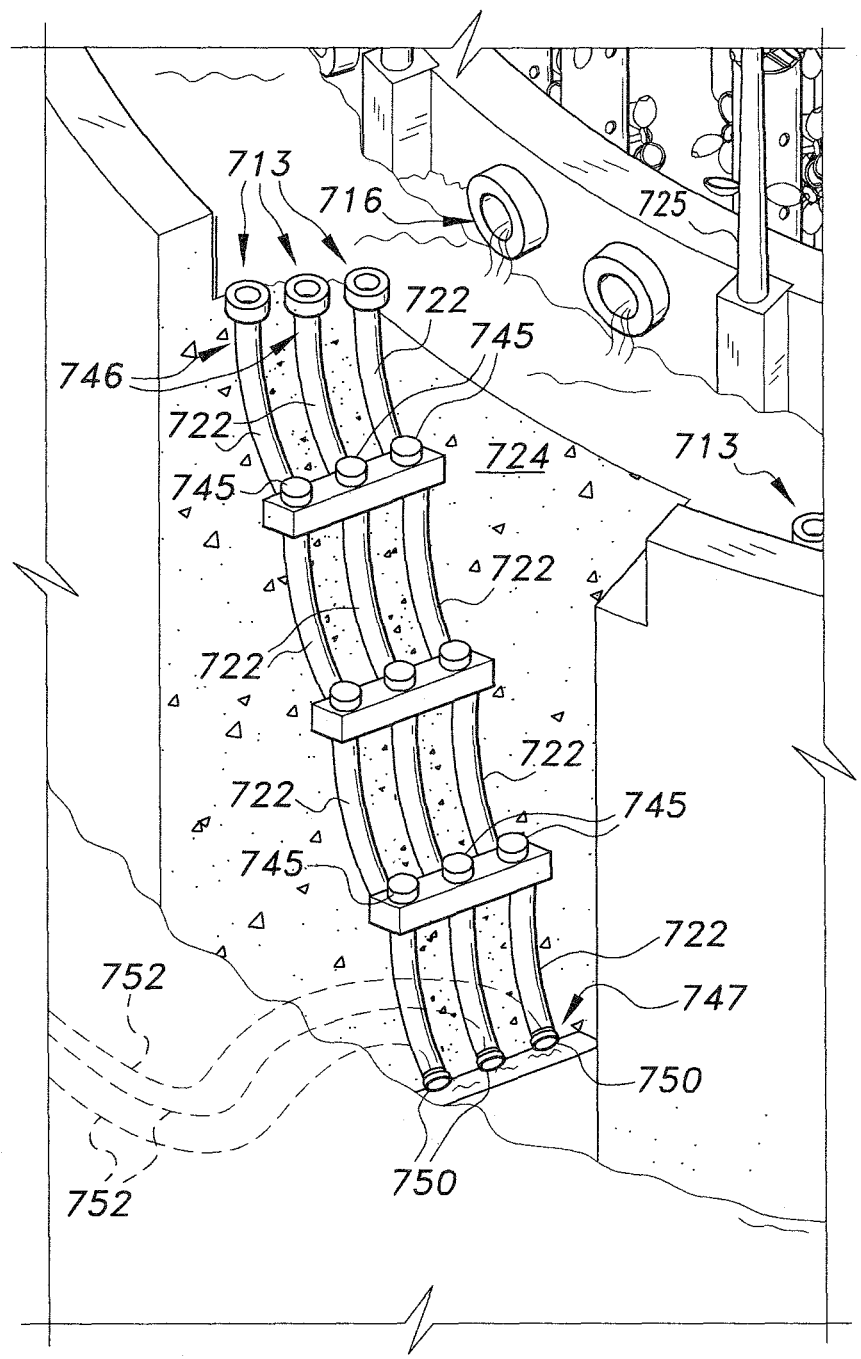
FIG. 9A is a perspective view of a plurality of penstocks for the hydroelectric power generating system shown in FIG. 7, illustrating their general features.
Figure 9B:
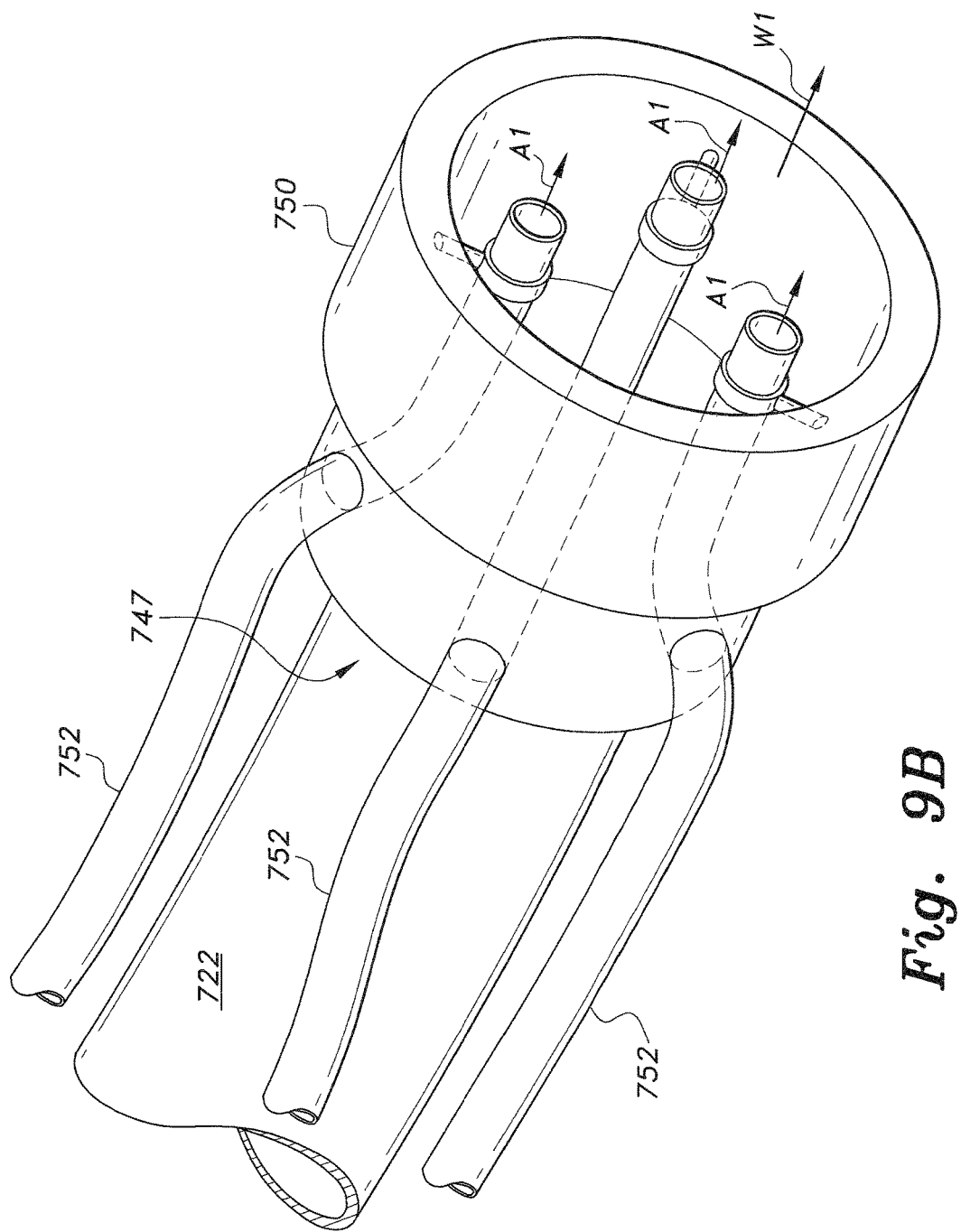
FIG. 9B is an exploded view of an attachment member coupled to the lower end of one of the plurality of penstocks for the hydroelectric power generating system shown in FIG. 9A, illustrating their general features.
Figure 9C:
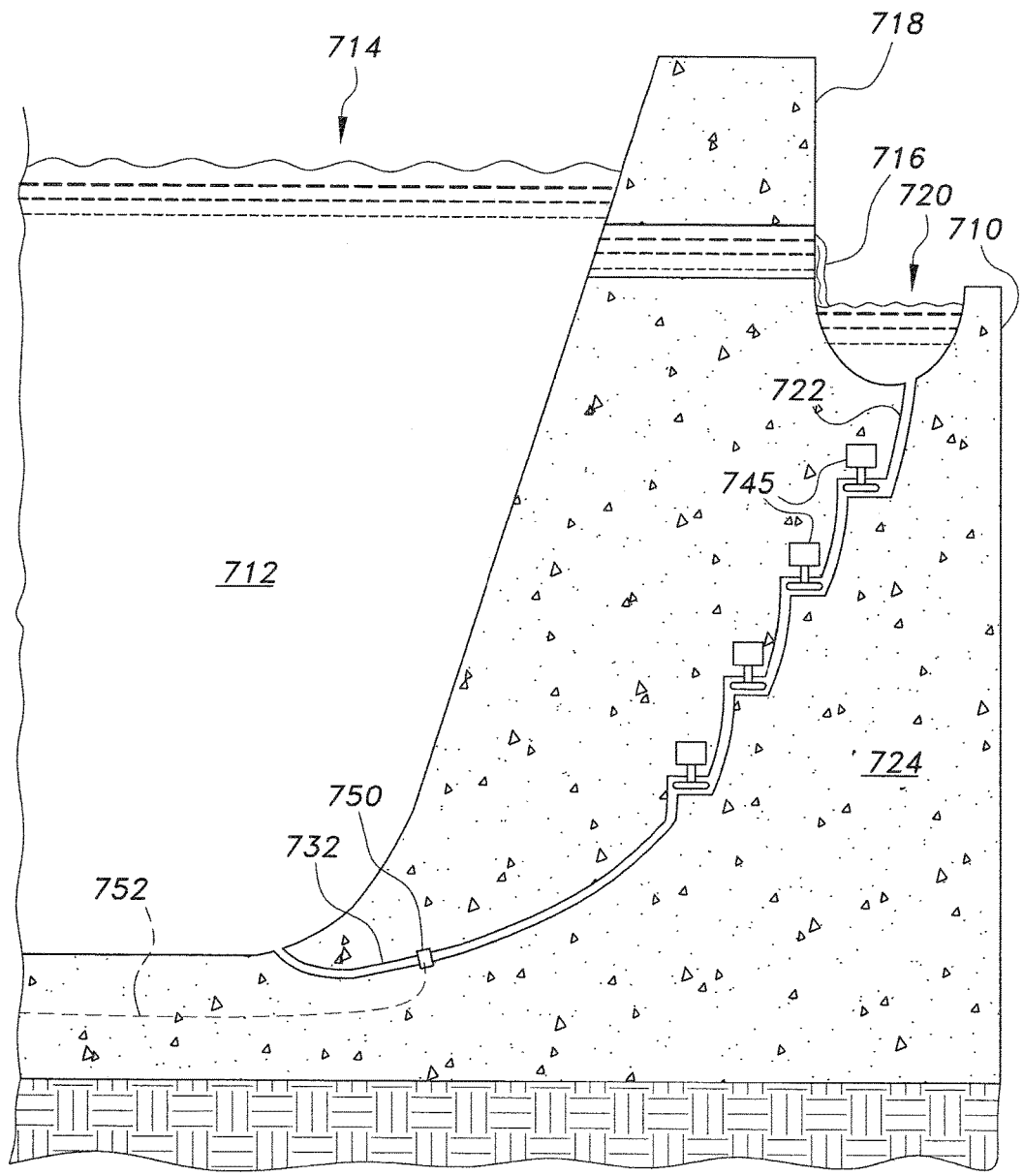
FIG. 9C is a sectional view of the hydroelectric power generating system shown in FIG. 7, illustrating its general features.

Referring to FIGS. 9A-9C, each of the plurality of penstocks 722 of the hydroelectric turbine generation system 700 includes an attachment member 750 positioned in communicating relation with the lower end 747 of each penstock 722. Each attachment member 750 is attached to a hose or pipe 752 configured for receiving compressed air from the air compressor AC and discharging the compressed air, as illustrated by the arrows A1, through the attachment member 750 so as to propel at least a portion of the downward flowing water out through the lower end 747 of each penstocks 722, as illustrated by the arrow WI, into a return passage 732 (FIG. 9C) and back into the collection basin 712 of the reservoir 710. The return passage 732 can be a fluid conduit extending from the attachment member 750 through the peripheral wall of the reservoir 710.

At least one primary outlet 715 extending through the peripheral wall of the reservoir and the outer vessel 728 can permit water from the collection basin 712 to flow to a discharge conduit DC back into the water source. For example, the primary outlet 715 can be opened so as to release the discharge water DW through the discharge conduit DC when the water level reaches above a predetermined level so as to prevent a flood. The primary outlet 715 can also be used to empty the collection basin 712 of the reservoir 710 for maintenance purposes.

Figure 10B:
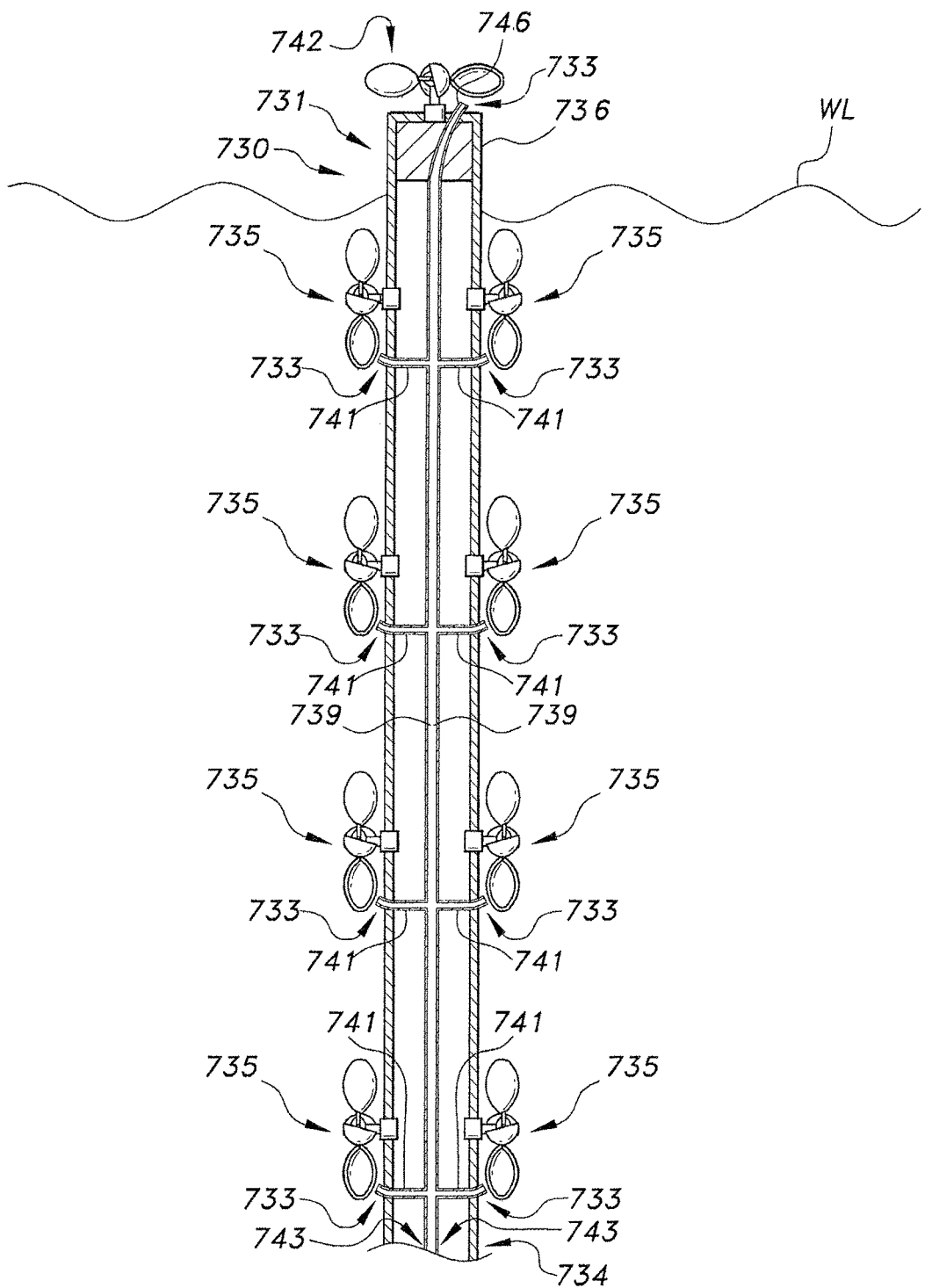

Referring to FIGS. 10A and 10B, each of the plurality of air columns 730 includes a cylindrical tube 736, such as a hollow cylindrical tube, having a top portion 731, a bottom portion 734, and a plurality of openings 733 along the sides of the cylindrical tube 736. Each of the plurality of bubble turbines 735 can be positioned above a corresponding opening 733. The air column 730 further includes a primary air tube 739. The primary air tube 739 has a first end 743 positioned in communicating relation with the air compressor AC to receive compressed air through hoses 752, a second end 746 extending through the top portion 731 of the cylindrical tube 736, and a plurality of secondary air tubes 741 positioned along the primary air tube 739. Each of the plurality of secondary air tubes 741 is configured for discharging compressed air through one of the plurality of openings 733 in the cylindrical tube 736 and, thereby, produce bubbles B, as illustrated in FIG. 10A, that can drive each of the bubble turbines 735.

Each of the plurality of bubble turbines 735 includes a rotor 760 having a plurality of rotor blades 762 (desirably 3 rotor blades 762 per rotor 760). It is to be noted that each of the plurality of rotor blades 762 can have any suitable shape, such as a generally concave shape, similar to the head of an upside-down spoon, so as to capture the bubbles B caused by the discharge of pressurized air through each of the openings 733 by each of the plurality of secondary air tubes 741. As discussed above, the bubbles B can cause the rotor 760 of each of the plurality of bubble turbines 735 to rotate so as to drive each bubble turbine 735 and generate electricity. Further, it is to be noted that each of the plurality of bubble turbines 735 can be positioned beneath the water line WL, such that turbulent water can also drive each of the bubble turbines 735.

Each of the plurality of air columns 730 includes a secondary wind turbine 742 mounted on the top portion 731 of the cylindrical tube 736, such as above the second end 745 of the primary air tube 739, so that in addition to the wind currents, the pressurized air being discharged through the second end 746 of the primary air tube 739 can be used to rotate the secondary wind turbine 742 and generate electricity.

By way of operation, source water SW is first diverted from the natural water source, such as a river, stream, lake, or ocean, via the water conduit WC, as illustrated in FIG. 7, and allowed to fill the collection basin 712 of the reservoir 710. It is to be noted that the primary outlet 715 is kept in the closed position so that the collection basin 712 can be filled up until the source water SW reaches a predetermined level, such that each of the bubble turbines 735 are beneath the water line WL.

Similar to the hydroelectric power generating system 10 and 110, source water SW can flow from the upper level 714 of the reservoir 710 through each of the sluice gates 716 and into the peripheral canal 720. Once in the peripheral canal 720, the source water SW can flow through the penstock entry port 713 and downward through the corresponding penstock 722 so as to provide the necessary hydrodynamic forces to operate the hydroelectric turbine generators 745 and convert same into useable energy, i.e. electrical power generation, that can be transferred to the junction box 737 to be sent to the power grid (not shown) or used to power the air compressor AC. It is to be noted that each of the penstock entry ports 713 can also include a conventional gate valve or other water control or shutoff device.

Once the source water SW flows downward through each penstock 722, however, the source water SW can be propelled via the use of compressed air from the air compressor AC, as illustrated by the arrows A1, into the return passage 752 (FIG. 9C) and back into the collection basin 712 of the reservoir 710. This feature is particularly useful when adequate water does not flow into the reservoir from the water source.

Wind currents can drive each of the primary wind turbines 725 mounted on the reservoir 712 and the secondary wind turbines 742 mounted on each air column 730 so as to generate sufficient electricity to drive the air compressor AC. Once activated, the air compressor AC can force compressed air through each of the air hoses 752 into the primary air tube 739 of each air column 730. The compressed air is then sent upward through each of the primary air tubes 739 and discharged through each opening 733 via each corresponding secondary air tube 741 positioned along the primary air tubes 739. Once discharged, the pressurized air forms air bubbles B that can rise to the top of the collection basin 712. As the air bubble B rise, however, they may be trapped beneath each of the blades 762 of the rotor 760. Subsequently, the upward pressure exerted by the rising air bubbles B can then cause each blade 762 and corresponding rotor 760 to rotate and drive each bubble turbine 735 and generate electricity that can be transferred via the junction box 737 to the power grid (not shown), such as through the power lines PL. Positioning the bubble turbines 735 beneath the water line WL, may also allow water currents to drive each bubble turbine 735 and further generate electricity. It should be understood that a plurality of hydroelectric power generating systems 700 can be provided with a pipeline or canal connecting the reservoir of adjacent systems.

It is to be understood that the present invention is not limited to the embodiments described above, but encompasses any and all embodiments within the scope of the following claims.

I claim:

1. A hydroelectric power generating system, comprising:
an outer vessel;
a reservoir having a peripheral wall, the peripheral wall being surrounded by the outer vessel, wherein the reservoir is adapted to store water from a source of water and the reservoir comprises a primary outlet capable of being opened so as to release water through a discharge conduit when a water level in the reservoir reaches above a predetermined level;
at least one sluice gate disposed in an upper portion of the peripheral wall of the reservoir;
a peripheral canal disposed about the upper portion of the reservoir, the reservoir selectively communicating with the canal through the at least one sluice gate;
at least one penstock below the canal and between the reservoir and the outer vessel, the at least one penstock having an outlet;

one or more hydroelectric turbine generators disposed along the at least one penstock;
  a plurality of air columns disposed within the reservoir, each air column having at least one bubble turbine, wherein each air column further includes a cylindrical tube and a plurality of openings along sides of the tube, each of the at least one bubble turbines being positioned above each of the plurality of openings;
  an air compressor in communication with the bubble turbines; and
  means for supplying electrical energy to the air compressor from an external source.

2. The hydroelectric power generating system according the claim 1, further comprising a plurality of primary wind turbines, wherein the primary wind turbines and the at least one bubble turbine are in communicating relation with a junction box, so that the energy generated by each of the primary wind turbines and each of the bubble turbines can be transferred to the junction box and transferred to a power grid and/or used as a power source for the air compressor.

3. The hydroelectric power generating system according to claim 2, wherein each wind turbine is positioned on the peripheral wall of the reservoir.

4. The hydroelectric power generating system according to claim 2, wherein each wind turbine is positioned adjacent to the outer vessel.

5. The hydroelectric power generating system according to claim 1, wherein the at least one penstock includes an upper end positioned in communicating relation with a penstock entry port and a lower end positioned in communicating relation with an attachment member, the attachment member being attached to a pipe configured for receiving air from the air compressor and discharging the compressed air into a collection basin of the reservoir.

6. The hydroelectric power generating system according to claim 1, wherein each air column further includes a primary air tube extending therethrough, the primary air tube having a first end positioned in communicating relation with the air compressor, a second end extending through top portion of the air column, and a plurality of secondary air tubes positioned along the primary air tube, each secondary air tube being configured for discharging the compressed air through each of the plurality of openings in the air column to drive each of the bubble turbines.

7. The hydroelectric power generating system according to claim 1, wherein each bubble turbine includes a rotor having a plurality of rotor blades for capturing bubbles caused by the discharge of pressurized air through each opening along the air column.

8. The hydroelectric power generating system according to claim 1, wherein each air column includes a secondary wind turbine mounted to a top portion thereof.

9. A hydroelectric power generating system, comprising:
  an outer vessel;
  a reservoir having a peripheral wall, the peripheral wall being surrounded by the outer vessel, wherein the reservoir is adapted to store water from a source of water;
  at least one sluice gate disposed in the upper portion of the peripheral wall of the reservoir and the reservoir comprises a primary outlet capable of being opened so as to release water through a discharge conduit when a water level in the reservoir reaches above a predetermined level;
  a peripheral canal disposed about the upper portion of the reservoir, the reservoir selectively communicating with the canal through the at least one sluice gate;
  at least one penstock below the canal and between the reservoir and the outer vessel, the at least one penstock having an outlet;
  one or more hydroelectric turbine generators disposed along the at least one penstock;
  a plurality of primary wind turbines;
  a plurality of air columns disposed within the reservoir, each air column having at least one bubble turbine, wherein each air column further includes a cylindrical tube and a plurality of openings along sides of the tube, each of the at least one bubble turbines being positioned above each of the plurality of openings;
  an air compressor, wherein the primary wind turbines and the at least one bubble turbine are in communicating relation with a junction box, so that the energy generated by each of the primary wind turbines and each of the bubble turbines can be transferred to the junction box and transferred to a power grid and/or used as a power source for the air compressor; and
  means for supplying electrical energy to the air compressor from an external source.

10. The hydroelectric power generating system according to claim 9, wherein each primary wind turbine is positioned on the peripheral wall of the reservoir.

11. The hydroelectric power generating system according to claim 9, wherein each primary wind turbine is positioned adjacent to the outer vessel.

12. The hydroelectric power generating system according the claim 9, wherein the at least one penstock includes an upper end positioned in communicating relation with a penstock entry port and a lower end positioned in communicating relation with an attachment member, the attachment member being attached to a pipe configured for receiving air from the air compressor and discharging the compressed air into a collection basin of the reservoir.

13. The hydroelectric power generating system according to claim 9, wherein each air column further includes a primary air tube having a first end positioned in communicating relation with the air compressor, a second end extending through top portion of the air column, and a plurality of secondary air tubes positioned along the primary air tube, each secondary air tube being configured for discharging the compressed air through each of the plurality of openings in the air column to drive each of the bubble turbines.

14. The hydroelectric power generating system according to claim 9, wherein each bubble turbine includes a rotor having a plurality of rotor blades for capturing bubbles caused by the discharge of pressurized air through each opening along the air column.

15. The hydroelectric power generating system according to claim 9, wherein each air column includes a secondary wind turbine mounted to a top portion thereof.

* * * * *